United States Patent Office 3,356,714
Patented Dec. 5, 1967

3,356,714
4-FLUORO-4,4-DINITROBUTYRIC ACIDS AND ESTERS THEREOF
Mortimer J. Kamlet, Silver Spring, Md., assignor to the United States of America as represented by the Secretary of the Navy
No Drawing. Filed Sept. 15, 1965, Ser. No. 491,497
10 Claims. (Cl. 260—487)

The invention described herein may be manufactured and used by or for the Government of the United States of America for governmental purposes without the payment of any royalties thereon or therefor.

This invention pertains to novel energetic compounds and more particularly to novel energetic compounds containing the fluorodinitromethyl group and a method for their preparation.

In a program to design insensitive high explosive molecules, a theoretical study of the factors which affect impact sensitivity was conducted. From this study, it was concluded that the entropy of activation in the decomposition process is a quantity strongly influencing sensitivity, with the steric conformation about the bond most readily broken being especially important, and it was predicted that compounds containing a fluorodinitromethyl group would comprise a class in which reduced sensitivity to impact and improved thermo-stability could be achieved without excessive sacrifice of explosive power.

Accordingly, it is an object of this invention to provide energetic compounds that contain the fluorodinitromethyl group.

It is another object of this invention to provide compounds that are useful as energetic plasticizers.

It is a further object to provide compounds that are useful as intermediates for forming energetic plasticizers.

These and other objects will become more readily apparent from reading the following detailed description of the invention.

The objects of this invention are accomplished by producing the following compounds: methyl 4-fluoro-4,4-dinitrobutyrate, 4-fluoro-4,4-dinitrobutyric acid, 2,2,2-trinitroethyl-4-fluoro-4,4-dinitrobutyrate and 2-fluoro-2,2-dinitroethyl-4-fluoro-4,4-dinitrobutyrate.

Methyl 4-fluoro-4,4-dinitrobutyrate is produced by fluorinating the alkali metal salt of methyl-4,4-dinitrobutyrate with perchloryl fluoride. The fluorination is generally performed at a temperature between about 0° and 50° C. in a solvent in which the alkali metal salt and perchloryl fluoride are at least partially soluble. The preferred solvents are those in which both reactants have mutually maximal solubilities since the reaction is slow in solvents in which either the dinitro salt or the perchloryl fluoride is insoluble. As examples of solvents that are preferred in this invention, there may be mentioned; dimethylformamide; lower alkanols such as methanol; aqueous lower alkanols; and the like, with dimethylformamide and aqueous methanol giving especially good results.

The alkali metal salt of methyl-4,4-dinitrobutyrate (the potassium salt is preferred), is generally prepared by reacting methyl-4,4,4-trinitrobutyrate with the corresponding alkali metal iodide in an alcoholic solution. The process is set forth in more detail in application Ser. No. 450,549 filed Apr. 23, 1965 by Glover et al. which is a continuation in part of application Ser. No. 236,169 filed Nov. 7, 1962, now abandoned, said applications hereby being incorporated by reference.

4-fluoro-4,4-dinitrobutyric acid may be prepared by hydrolyzing methyl-4-fluoro-4,4-dinitrobutyrate in the presence of a mineral acid. 2,2,2-trinitroehyl-4-fluoro-4,4-dinitrobutyrate and 2-fluoro-2,2-dinitroethyl-4-fluoro-4,4-dinitrobutyrate are generally prepared by reacting 4-fluoro-4,4-dinitrobutyric acid with 2,2,2-trinitroethanol and 2-fluoro-2,2-dinitroethanol respectively in an anhydrous sulfuric acid solvent (about 96%–130% sulfuric acid), at a temperature between about room temperature and 100° C. This reaction for making carboxylic esters of nitroalcohols is set forth in more detail in Patent No. 3,160,654 granted to J. C. Conly on Dec. 8, 1964, which is hereby incorporated by reference.

The 2-fluoro-2,2-dinitroethanol used in the above reaction is generally prepared by fluorinating an alkali metal salt of 2,2-dinitroethanol with perchloryl fluoride. The preparation of fluorodinitroethanol is set forth in more detail in copending application Ser. No. 480,258, filed on Aug. 13, 1965, by M. J. Kamlet which is hereby incorporated by reference. Alternatively, the fluorodinitroethanol may be prepared by the method described in application Ser. No. 387,556, filed on July 31, 1964, by H. G. Adolph which is also hereby incorporated by reference.

The following examples are illustrative of the invention but they are not to be considered as limiting the invention in any manner.

GENERAL PROCEDURE FOR FLUORINATING WITH PERCHLORYL FLUORIDE

The apparatus generally involved a gas inlet tube and stirrer in a three-neck round bottom flask surmounted by a reflux condenser and with bubble counters fore and aft. After introducing the salt and solvent, most of the air was purged from the system by blowing through a rapid stream of perchloryl fluoride (PF) which was vented to the hood. The rate of input of PF was then cut back until there was a partial vacuum in the system as shown by the liquid level rising in the bubble counter aft, this partial vacuum being due to uptake of the PF by the solvent in forming a saturated solution. Reaction of the salt of the dinitro compound was then evidenced by a rapid input of PF with the partial vacuum being maintained. Generally, where reaction took place the rate was determined by the speed of solution of the gas. Increasing the stirring rate would increase PF uptake, decreasing it would have the opposite effect.

CAUTION

The filtration operations should be well shielded and the filter cakes exhaustively washed with additional solvent before being allowed to air dry since the organic mixtures contain both combustible solvents and explosive organic materials.

Example I

At 37° uptake of PF by a suspension of 73 g. potassium methyl dinitrobutyrate in 750 ml. methanol was substantially complete in five hours. After cooling the mixture to −10°, 37.5 g. of potassium chlorate was filtered off, most of the methanol stripped off in vacuo, an additional 0.8 g. potassium chlorate filtered off (98.5% total) and the remaining methanol removed to leave 62 g. of crude methyl-4-fluoro-4,4-dinitrobutyrate as a pale yellow oil. On standing in the freezer the material solidified and showed M.P. ca. 2–3°.

Example II

Fifty-two grams of the crude material of Example I were added to 350 ml. constant boiling hydrochloric acid and the mixture heated to reflux. After three hours all but about 1 ml. of a tan oil had dissolved. Charcoal was added, refluxing continued for 15 minutes and the mixture filtered hot. During the filtration additional oil separated from the clear pale-green solution but this redissolved on addition of 120 ml. water and 130 ml. hydrochloric acid. The solution after standing overnight in the freezer deposited as a first crop 22.8 g. of crude 4-fluoro-4,4-dinitrobutyric acid, M.P. 35–38°, as chunky white bars. Concentration of the mother liquor yielded in two crops an addition 13.1 g. (total 77%) of similar material. Recrystallization of 3.0 g. of the crude product from chloroform-carbon tetrachloride afforded 2.7 g. of pure fluorodinitrobutyric acid as fine long white needles, M.P. 37.2–38.6°.

*Example III*

A solution of 9.75 g. (0.050 mole) fluorodinitrobutyric acid and 10.0 g. (0.055 mole) trinitroethanol in 25 ml. 10% oleum was heated to 50° and held for 2¼ hrs. during which time a second phase amounting to about ⅒ the total volume of the solution separated. On cooling to 15°, the second phase solidified. The mixture was poured into a stirred mixture of 150 g. ice in 150 ml. methanol and 14.9 g. (84%) of crude 2,2,2-trinitroethyl-4-fluoro-4,4-dinitrobutyrate filtered off as a white solid, M.P. 34–38°. Recrystallization from methanol-water yielded three crops totaling 12.0 g. of 2,2,2-trinitroethyl-4-fluoro-4,4-dinitrobutyrate as clean white feathery needles, M.P. 37.5–40°. A further recrystallization of 5.3 g. from hexane-ether afforded 4.8 g. of an analytical sample as clusters of tiny white needles, M.P. 42.6–43.8°.

This compound due to the presence of the trinitromethyl group did not have the reduced sensitivity possessed by the compounds having only fluorodinitromethyl groups.

*Example IV*

A solution of 3.90 g. (0.020 mole) of fluorodinitrobutyric acid and 4.5 g. of crude fluorodinitroethanol in 15 ml. 10% oleum, maintained 2½ hrs. at 50° and poured over 100 g. crushed ice, yielded 2.7 g. (dry) of a gummy white solid, M.P. 38–41°. A single recrystallization of 2.2 g. of this material from ether-hexane yielded 1.8 g. of an analytical sample of 2-fluoro-2,2-dinitroethyl-4-fluoro-4,4-dinitrobutyrate as feathery needles, M.P. 41.4–42.2°.

The compounds of this invention may be used as energetic plasticizers or as intermediates for forming energetic plasticizers for solid propellants. These compounds have particular utility as energetic plasticizers in propellants of the composite type comprising an oxidizer dispersed in a resinous binder.

Obviously many modifications and variations of the present invention are possible in the light of the above teachings. It is therefore to be understood, that within the scope of the appended claims, the invention may be practiced otherwise than as specifically described.

What is claimed is:
1. A compound selected from the group consisting of:
    (a) methyl-4-fluoro-4,4-dinitrobutyrate,
    (b) 4-fluoro-4,4-dinitrobutyric acid,
    (c) 2,2,2-trinitroethyl-4-fluoro-4,4-dinitrobutyrate and
    (d) 2-fluoro-2,2-dinitroethyl-4-fluoro - 4,4 - dinitrobutyrate.
2. The compound methyl-4-fluoro-4,4-dinitrobutyrate.
3. The compound 4-fluoro-4,4-dinitrobutyric acid.
4. The compound 2,2,2-trinitroethyl-4-fluoro-4,4-dinitrobutyrate.
5. The compound 2-fluoro-2,2-dinitroethyl-4-fluoro-4,4-dinitrobutyrate.
6. A process for producing a compound containing a fluorodinitromethyl group which comprises reacting an alkali metal salt of methyl-4,4-dinitrobutyrate with perchloryl fluoride to produce methyl-4-fluoro-4,4-dinitrobutyrate.
7. The process of claim 6 wherein the alkali metal salt is the potassium salt of methyl-4,4-dinitrobutyrate.
8. The process of claim 7 wherein said reaction is performed in an organic solvent selected from the groups consisting of lower alkanols, aqueous lower alkanols, and dimethylformamide.
9. The process of claim 8 wherein the reaction is performed at a temperature between about 0° C. and 50° C.
10. The process of claim 6 wherein the methyl-4,4-dinitrobutyrate is hydrolyzed to produce 4-fluoro-4,4-dinitrobutyric acid.

References Cited
UNITED STATES PATENTS

| | | | |
|---|---|---|---|
| 3,000,970 | 9/1961 | Frankel | 260—644 |
| 3,203,999 | 8/1965 | Gardner et al. | 149—88 |
| 3,223,725 | 12/1965 | Hill | 260—471 |
| 3,267,134 | 8/1966 | Bissell | 260—487 |

LORRAINE A. WEINBERGER, *Primary Examiner.*

BENJAMIN R. PADGETT, *Examiner.*

LELAND A. SEBASTIAN, ALBERT P. HALLUIN,
*Assistant Examiners.*